(No Model.) 3 Sheets—Sheet 1.

W. BUTTS.
ICE CUTTING MACHINE.

No. 528,073. Patented Oct. 23, 1894.

WITNESSES
Chapman Fowler
J. Edw. Fowler

INVENTOR
William Butts,
by J. Walter Fowler,
Attorney (No Model.) 3 Sheets—Sheet 3.

W. BUTTS.
ICE CUTTING MACHINE.

No. 528,073. Patented Oct. 23, 1894.

WITNESSES
Chapman Fowler
J. Edw. Fowler

INVENTOR
William Butts,
by T. Walter Fowler
Attorney

UNITED STATES PATENT OFFICE.

WILLIAM BUTTS, OF NEW YORK, N. Y., ASSIGNOR TO CHARLES MULFORD, OF SAME PLACE.

ICE-CUTTING MACHINE.

SPECIFICATION forming part of Letters Patent No. 528,073, dated October 23, 1894.

Application filed January 12, 1894. Serial No. 496,646. (No model.)

*To all whom it may concern:*

Be it known that I, WILLIAM BUTTS, a citizen of the United States, residing at New York, in the county of New York and State of New York, have invented certain new and useful Improvements in Ice-Cutting Machines; and I do hereby declare the following to be a full, clear, and exact description of the invention, such as will enable others skilled in the art to which it appertains to make and use the same.

Figure 1:
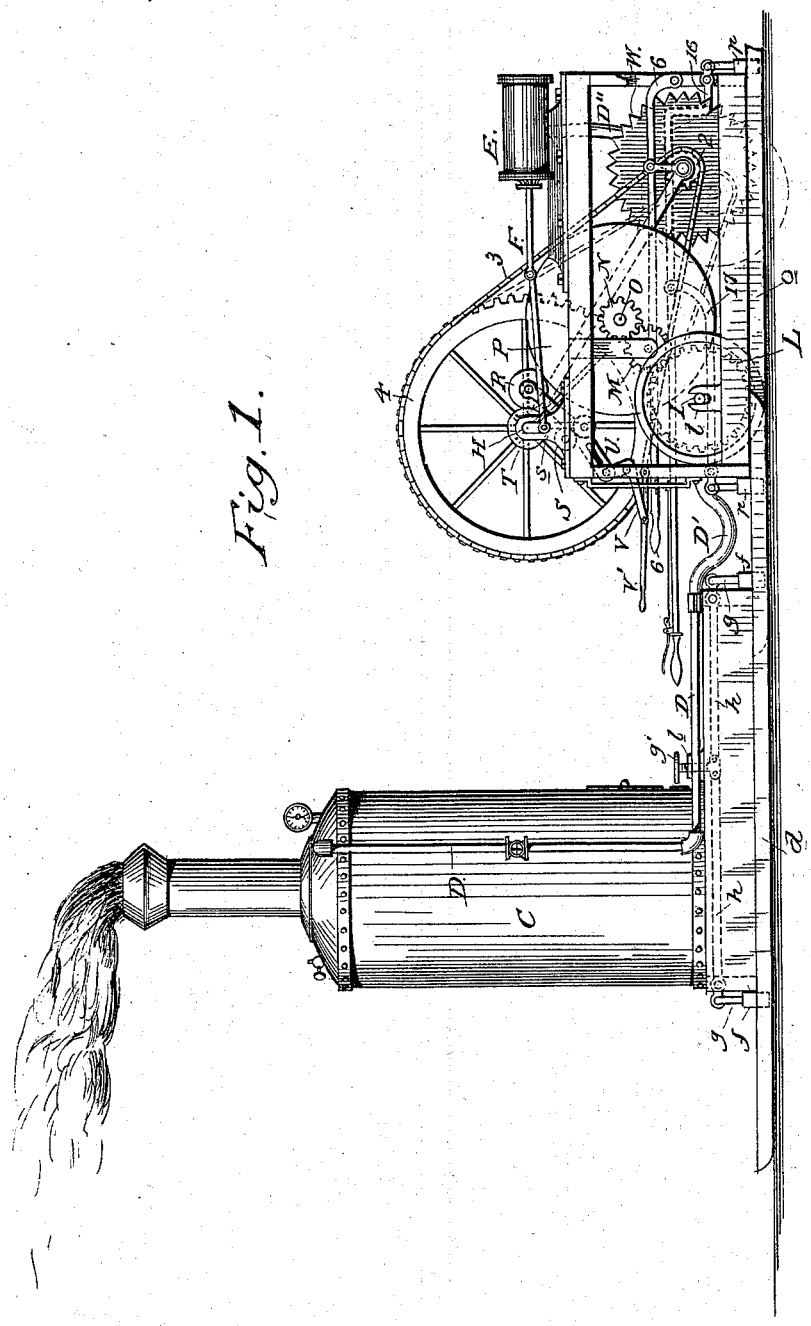
Figure 2:
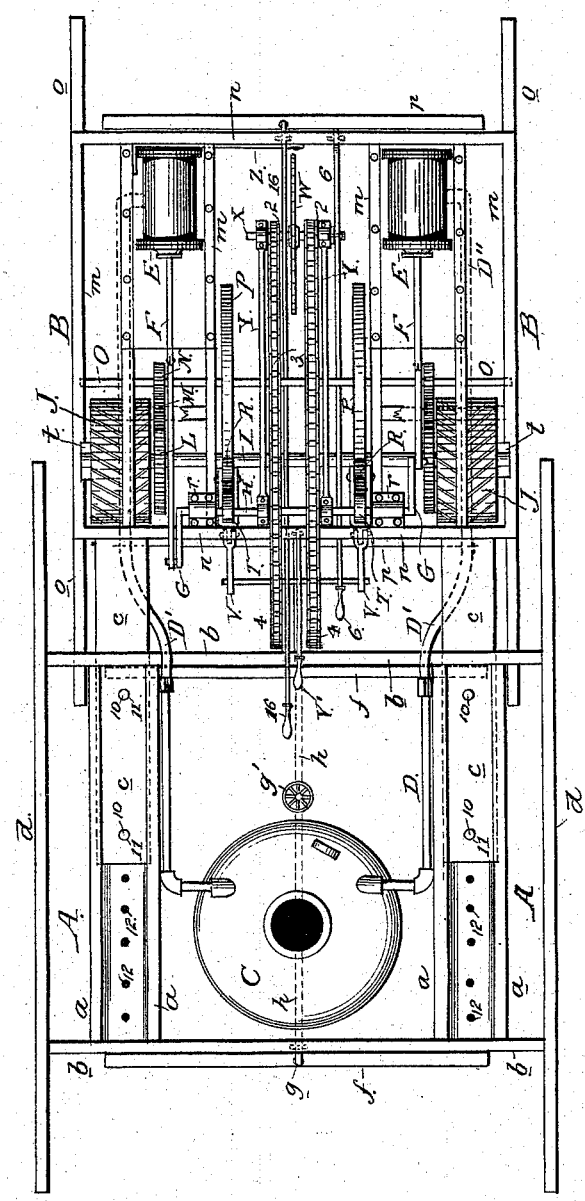
Figure 3:
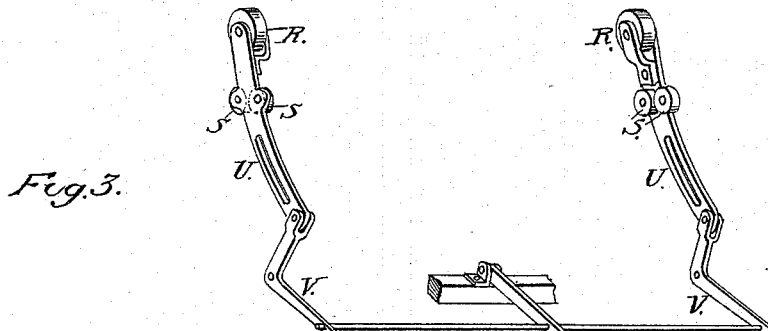
Figure 4:
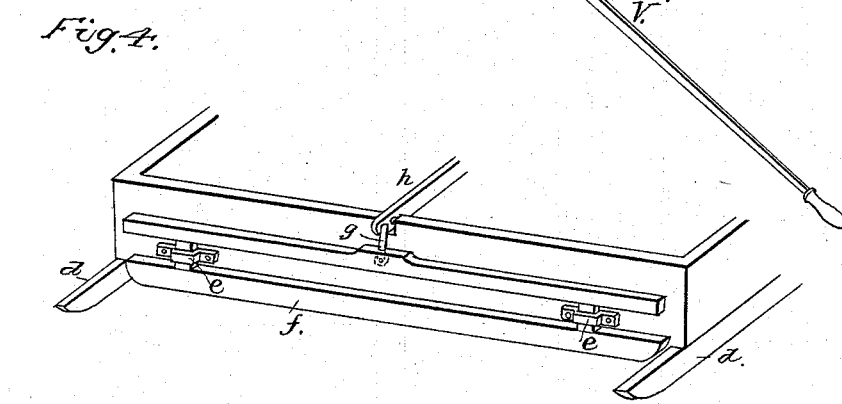
Figure 5:
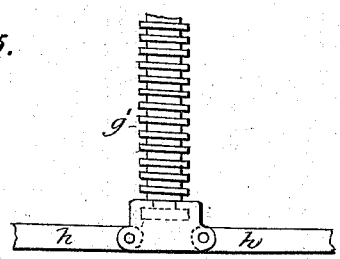
Figure 7:
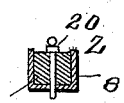
Figure 6:
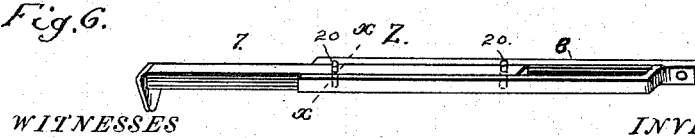

Figure 1, represents a side view of an ice cutting machine embodying my invention. Fig. 2, is a plan elevation of the same. Fig. 3, is a detail of the sliding frames U and their connections. Fig. 4, is a detail showing the manner of raising and lowering the side runners. Fig. 5, is a detail of the lever operating screw. Fig. 6, is a detail of one of the gages. Fig. 7, is a cross sectional view on the line $x-x$ of Fig. 6.

My invention relates to certain new and useful improvements in machines for cutting ice on ponds, rivers, lakes, and other bodies of water for storage in ice houses, of that class which is propelled by a steam engine or engines located upon the frame of the machine, and acting through suitable connections to impart motion to the traction or driving wheels and saw, provision being made for the vertical adjustment of the cutting saw or saws, for the longitudinal extension of the main frame to increase the bearing surface of the machine upon thin or weak ice; for the reversal of the movement of the traction devices at the end of the travel of the machine, or elsewhere, without reversing the engine; for the lateral transportation of the machine on the ice, and for facilitating the harvesting of the ice in a rapid and economical manner, thereby saving time and expense in the cutting and housing of the ice.

My invention consists of the parts and construction and combination of parts forming an ice cutting machine, as I shall hereinafter fully describe and specifically point out in the claims.

In carrying out my invention I form the main frame of the machine of suitable timbers of requisite form and size and suitably connected. This frame consists of two parts A and B, one of which, A, I shall designate as the boiler frame and the other, B, I shall term the frame of the traction apparatus, but the two frames are adapted to form a single main frame suitably coupled and capable of longitudinal extension for a purpose I will hereinafter indicate. The boiler frame consists of suitable longitudinal timbers or beams $a$ and cross-timbers or beams $b$, the longitudinal beams being suitably spaced, and, if desired, grooved or channeled to receive and form a guide for the rear extensions $c$ of the traction frame whereby the two frames are adapted to telescope to shorten the length of the whole machine, as when working upon ice of considerable strength or thickness, or may be extended or drawn out to increase the length of the machine and thereby greatly increase its bearing surface upon the ice. When the ice to be operated upon is thin or weak this feature is important as the extension of the frame of the machine enables its weight to be diffused over a much greater surface thereby enabling the enlarged area of surface covered by the machine to more readily support the weight of the machine.

Exterior of the longitudinal beams $a$ and normally extending some distance in front and rear of the cross beams $b$ are suitable runners $d$ the under faces of which will be provided with metal shoes or plates similar to sleds and like vehicles adapted to be propelled over the surface of ice or snow; while extending parallel with the cross beams $b$ and suitably secured are similar transverse runners $f$ which are designed to support the boiler frame during the shifting of the machine laterally from one place to another, the said runners $f$ being guided in bearings $e$, Fig. 4, or otherwise provided with means for enabling them to be adjusted vertically so that they may be moved from their normal position slightly above the surface of the ice, into contact with the ice, whereby they become the fulcrum points upon which the body of the boiler frame and its adjuncts may be lifted, bodily, to raise the longitudinal runner out of contact with the ice, to facilitate the lateral shifting or transportation of the machine into position to make a new cut. Various means may be provided for this elevation of the boiler frame, and a desirable method is shown in Figs. 2 and 5, in which links or bolts *g* or equivalent devices on the ends or other parts of suitably fulcrumed levers *h*, on the boiler frame, are adapted to be forced into contact with the runners *f*, which, being vertically slidably mounted will be forced downward into contact with the ice for their full length, when the continued pressure on the runners, due to a further movement of the screw *g'* and the resistance offered by reason of the weight of the boiler frame, will overcome the resistance of said boiler frame and cause the latter to be elevated until the longitudinal runners are clear of the surface of the ice. When this latter object has been attained, the screw and its nut *l* will retain the parts elevated until the machine has been shifted into its new position and is ready for a movement in a longitudinal direction, when the screw is run down and the parts caused to assume their normal positions with the transverse runners out of contact with the ice so as not to retard the forward or backward movement of the machine during the cutting operation.

The boiler C may be of any well known type, preferably vertical, and is also preferably mounted near the rear of its frame so as to provide space at the front for the engineer or fireman, or both, and from this boiler extends a pipe D with a flexible connection D' for conducting steam to another pipe D" and thence to the engines for operating the saw and its power transmitting connections and the traction devices.

The traction frame B supports the working parts of the machine, and it consists of suitably constructed longitudinal and cross beams *m* and *n*, with the rearward extensions *c* adapted to enter the space between the beams *a* of the boiler frame, whereby the two frames may be moved close together or drawn farther apart to decrease or increase the length of the machine while in operation, suitable provision being made as by the pins 10 dropping through holes 11 and 12 to lock the two frames in their adjusted positions to form a practically rigid frame and thereby prevent the displacement of said frames.

The traction frame is provided with longitudinal and transverse runners *o*, *p*, similar to those before described; the rear ends of the longitudinal runners overlapping the forward ends of the runners *d* of the boiler frame, and the transverse runners *p* being capable of vertical movement by means of the levers 16 and 17 suitably connected and fulcrumed and adapted to act in conjunction with the said runners to elevate the entire machine and facilitate its movement sidewise.

Upon the traction frame, and preferably at the forward portions of its sides are mounted engines E of any suitable type, whose piston rods or pitmen F are suitably connected with the cranks G on the ends of a main driving shaft H, which latter shaft is suitably journaled in boxes or bearings *r* in the standards *s* rising from a bed or frame extending upwardly from the timbers or beams of the traction frame.

Within suitable slotted bearings *t* in the traction frame B, the ends of the main traction shaft I are loosely mounted, and upon this shaft the bearing wheels J are secured and have their peripheries so formed as to increase their tractile bearing upon the ice. This shaft I has its end loosely mounted so that the bearing wheels will always rest upon the ice and will not be lifted should the runners meet with an uneven or elevated ridge or part of the ice. This arrangement relieves the machine of the strain which would occur if the ends of the shaft I had no vertical adjustment to accommodate itself to the irregularities in the ice.

Upon the shaft I the large gear wheels L are secured adapted to mesh with the idlers M which in turn mesh with and are driven by the pinions N, on a counter-shaft O, also suitably mounted, the said counter-shaft also carrying near its center the large friction wheels P, adapted to be driven by frictional contact with pulleys R and S interposed between them and other frictional pulleys T on the drive shaft H. These pulleys R and S are mounted in a sliding or other frame or bearing U, see Fig. 3, suitably connected with bell crank levers V and an operating lever V' and pawl and ratchet mechanism, and form a reversing mechanism for the traction mechanism. When the lever V' is moved in one direction each of the frictional pulleys R is shifted by its bell crank levers and sliding frame until its periphery contacts with the peripheries of the large friction wheels P and the drive friction pulleys T, which will drive the traction devices through the connections hereinafter described in one direction, but when the lever V' is moved in the opposite direction the friction pulleys R will be moved out of contact with the pulleys P and T, and the other friction pulleys S of the reversing mechanism will be forced into contact with said pulleys P and T on the opposite side to turn the pulleys P and traction devices in a reverse direction while the saw revolves in the same direction. This reversal of the direction of the travel of the machine is instantly effected, and is important as it enables the rotation of the saw to be continued in the same direction when the machine has made its full forward movement, while the direction of the traction wheels and connections are reversed so that the machine, after being shifted into a new position, will start upon a backward or return movement without necessitating a reversal of the engine or the turning around of the machine.

The saw W is of a well known form, mounted upon a mandrel X journaled in the forward ends of the swinging arms Y, and this mandrel carries the sprocket pinions 2 around which pass the chains 3 from the large sprocket wheels 4 on the main drive shaft H, whereby the motion and power of this shaft in a greatly accelerated form are transmitted to the saw to drive the latter with great speed and power; and the arms which comprise the saw supporting frame may have their free ends adjusted in vertical planes and retained in any adjusted position by means of a lever 6 and pawl and ratchet mechanism, or by other well known means whereby the depth the saw is intended to cut is regulated.

On the lower forward part of the machine is a gage Z of any desired and well known form, herein shown as consisting of a fixed member 8 see Fig. 6 pivoted at one end to the main frame and a slidable member 7 and provided with pins 20 passing through holes in said members for fixing the adjustment of the movable member. This gage is intended to determine the width of the cakes or blocks of ice to be cut so that they may be of a uniform size.

Having thus described my invention, what I claim as new, and desire to secure by Letters Patent, is—

1. An ice cutting machine the frame of which is longitudinally extensible to increase the bearing surface upon the ice.

2. An ice cutting machine having cutting and propelling devices, and having its main frame in sections adapted to telescope and to be extended whereby the weight of the machine is distributed over a larger area of ice surface.

3. An ice cutting machine consisting of a sectional frame one section of which supports a boiler while the other section supports the traction devices and saw cutting mechanism, one of said frames having an extension adapted to enter guides in the other frame whereby the length of the frame may be regulated, and means for securing the sections of the frame to each other.

4. In an ice cutting machine, the combination of a main frame formed of sections adapted to telescope and to be extended, each section of said frame having longitudinal runners, and transverse runners on said sections and normally supported out of contact with the surface of the ice, and adapted to be moved into contact with said surface to raise the machine bodily and permit its lateral transportation.

5. In an ice cutting machine, the frame thereof, said frame being longitudinally extensible and provided with longitudinal runners, cutting and propelling devices for the machine, and transverse runners upon the forward and rear portions of each section of the extensible main frame adapted to be adjusted in pairs in vertical planes to elevate the machine bodily and permit its lateral transportation.

6. An ice cutting machine comprising a frame formed of sections adapted to telescope, and each section being provided with fixed longitudinal runners and vertically movable transverse runners, means for forcing the transverse runners from their normal position above the surface of the ice into contact with said surface and raising the machine bodily whereby the transverse runners support the elevated machine during its lateral transportation, and cutting and propelling devices.

7. In an ice cutting machine, a frame formed of sections and longitudinally extensible, fixed longitudinal runners and vertical movable transverse runners on each section of said frame, and means for adjusting the transverse runners comprising levers connecting the said runners in pairs, connections from the short arms of the levers to the runners, and a screw connecting the free ends of the long arms of the levers, and cutting and propelling mechanisms.

8. In an ice cutting machine, the frame for the traction devices having longitudinal and transverse runners, in combination with a lever 16 fulcrumed near one end to the frame and having its short arm connected with one of the transverse runners while its opposite end or long arm extends inwardly, and a lever 17 pivoted at one end to the lever 16 between its opposite ends, and fulcrumed near its outer end to said frame with its short arms connected with the opposite transverse runner, whereby said runners are adjusted vertically, substantially as herein described.

In testimony whereof I affix my signature in presence of two witnesses.

WILLIAM BUTTS.

Witnesses:
T. WALTER FOWLER,
CHAPMAN FOWLER.